May 24, 1938. J. T. BOYD 2,118,029
PRESSURE CONTROLLED APPARATUS
Filed Aug. 10, 1936 3 Sheets-Sheet 1

INVENTOR.
James T. Boyd
BY Cumpston + Shepard
his ATTORNEYS

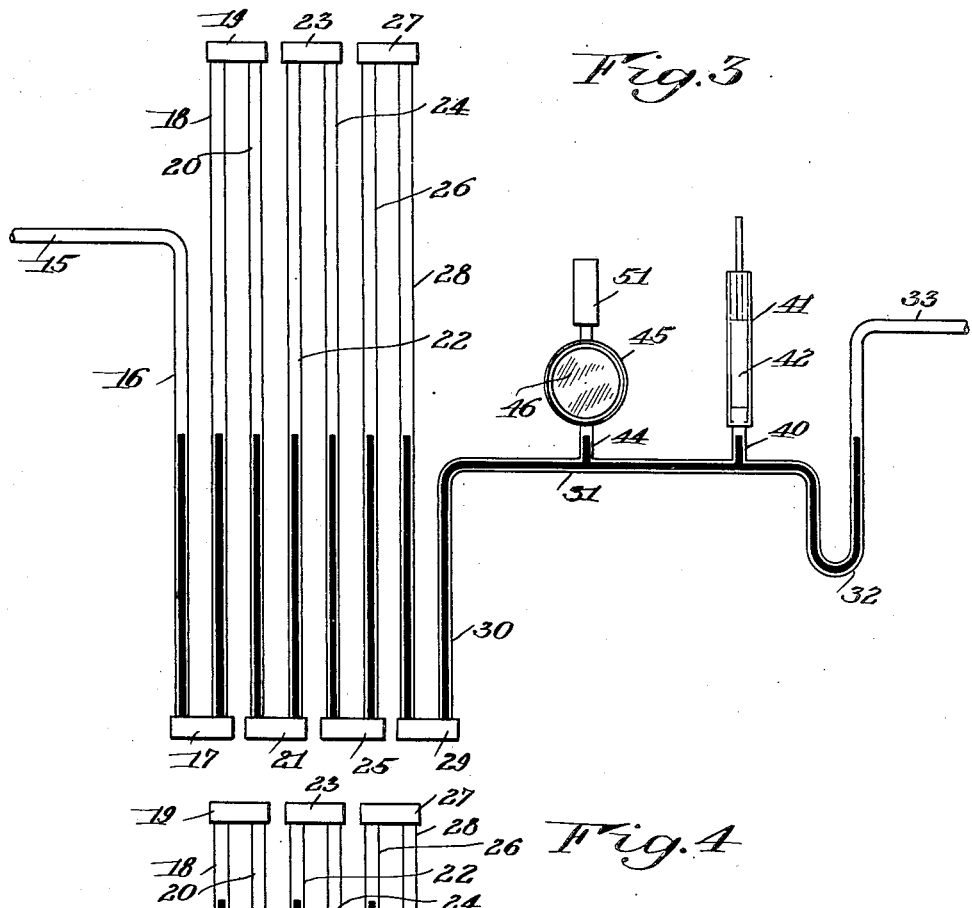
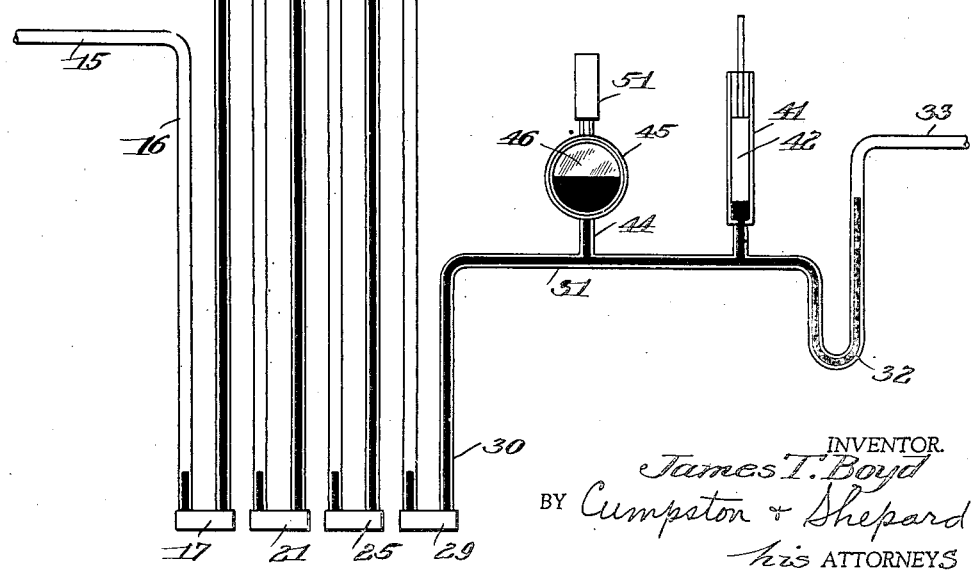

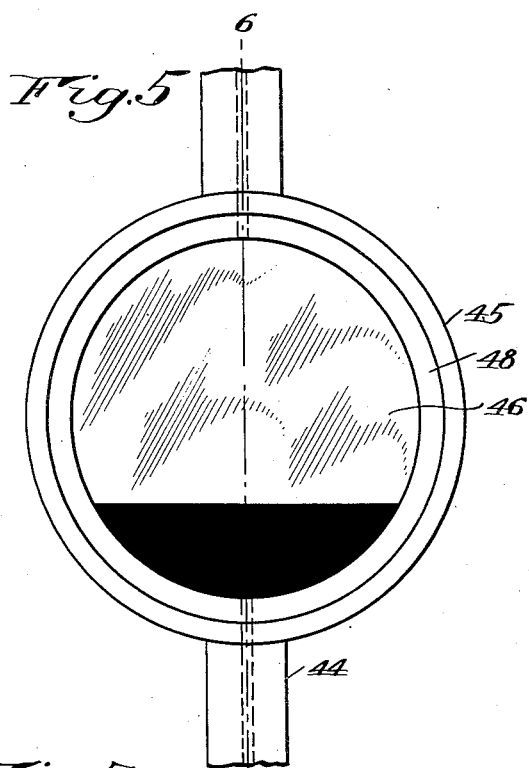
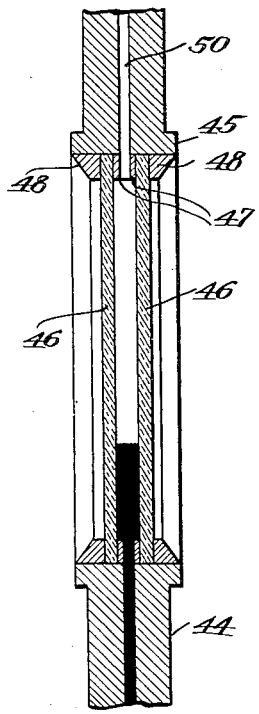
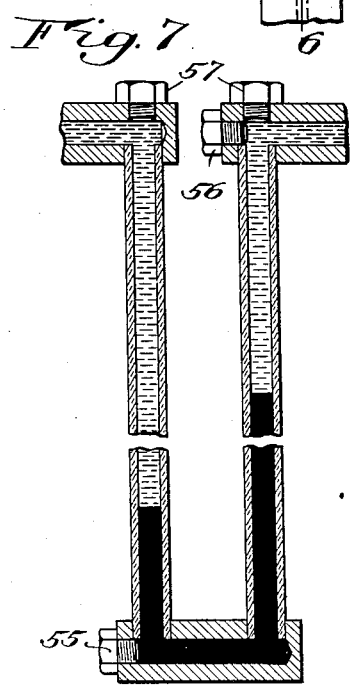
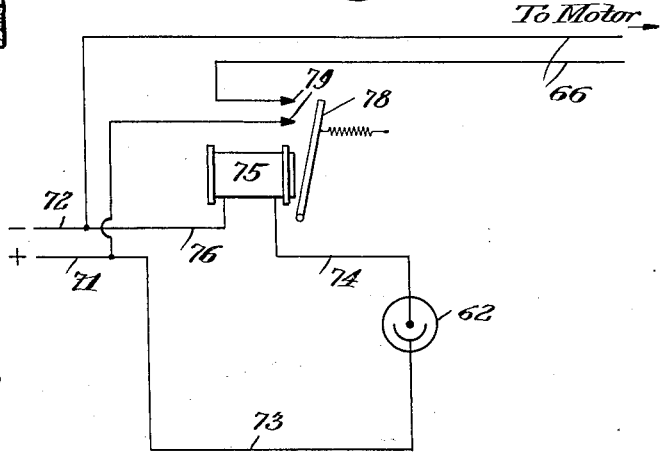

Patented May 24, 1938

2,118,029

UNITED STATES PATENT OFFICE 2,118,029

PRESSURE CONTROLLED APPARATUS

James T. Boyd, Bogalusa, La.; Nellie Lee Boyd, owner by Decrees of Court and by assignment Application August 10, 1936, Serial No. 95,296

12 Claims. (Cl. 236—26)

This invention relates to control apparatus capable of various uses and controlled, in turn, by fluid pressure.

An object of the invention is the provision of a generally improved and more satisfactory control apparatus which is controlled by pressure.

Another object of the invention is the provision of simple and effective apparatus controlled by fluid pressure for controlling the fluid pressure to keep it substantially constant.

Still another object of the invention is the provision of pressure controlled apparatus particularly adapted to and suitable for the control of steam pressure in a boiler. A further object is the provision of control apparatus which eliminates, to a large extent, mechanical moving parts.

A still further object is the provision of control apparatus particularly useful in connection with a gas fired boiler.

To these and other ends the invention resides in certain improvements and combinations of parts, all as will be hereinafter more fully described, the novel features being pointed out in the claims at the end of the specification.

In the drawings:

Fig. 3 is a diagrammatic view of parts of the apparatus in an initial position before the pressure is turned on;

Fig. 4 is a similar view of the same parts in normal operative position after the pressure is turned on;

Fig. 5 is a face view of a mercury shutter forming part of the apparatus;

Fig. 6 is a vertical section taken substantially on the line 6—6 of Fig. 5;

Fig. 7 is a diagrammatic view of one of the U-tubes forming part of the apparatus, and Fig. 8 is a schematic wiring diagram of part of the electrical connections of the apparatus.

The same reference numerals throughout the several views indicate the same parts.

Figure 1:
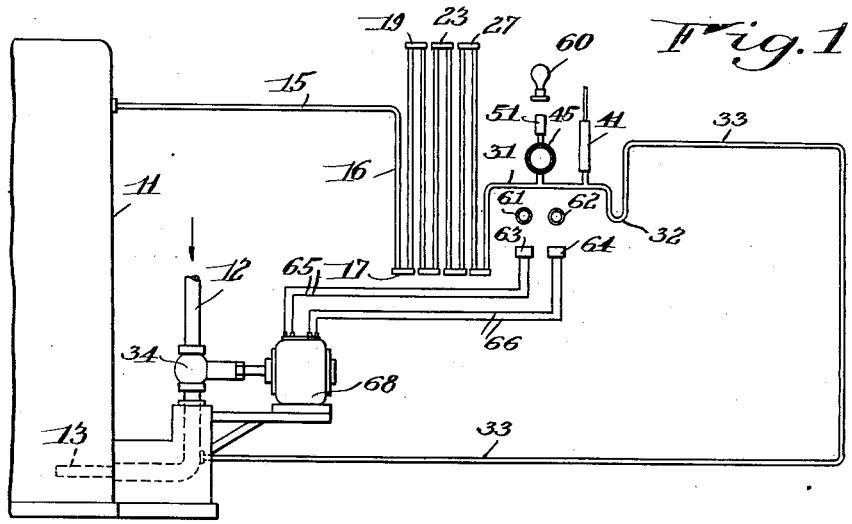
Fig. 1 is a diagrammatic view of apparatus constructed in accordance with a preferred embodiment of the invention, applied to a gas fired boiler.

Although this apparatus is not confined in its usefulness to boilers, it may be conveniently described in connection with a gas fired steam boiler shown at 11 in Fig. 1, the boiler being heated by the combustion of inflammable gas supplied through a gas main 12 to a burner 13.

A conduit 15 is connected to the boiler or associated parts in such manner as to carry and be subject to the steam pressure. It may be connected directly to the upper part of the boiler, or to a header, steam main, or the like. The conduit 15 leads to and is connected to the upper end of a substantially vertical tube or conduit 16, the lower end of which is connected through the connection 17 to the lower end of a tube 18, whose upper end is connected by the connection 19 to the upper end of a tube 20. The lower end of this tube is connected by a connection 21 to the next tube 22, the upper end of which is connected by the connection 23 to a tube 24, whose lower end is connected at 25 to a tube 26. The upper end of the latter is connected at 27 to a tube 28 connected at 29 to the lower end of a tube 30. This tube 30 is connected to or formed integrally with a section 31 extending approximately horizontally and terminating in a U-tube section 32 leading to a conduit 33 which is connected to the gaseous fuel supply pipe beyond or on the burner side of the control valve 34.

The section 31 of the conduit has two branches extending upwardly from it. One of these, 40, leads to a chamber 41 having an adjusting plunger 42 therein. The other branch 44, leads upwardly to the lower edge of a mercury shutter preferably formed, as best shown in Figs. 5 and 6, by a metallic casing 45 having two disks of glass 46 spaced from each other by spacing ring members 47 and held in place by rings 48. A passage-way 50 leads upwardly from the space between the glass plates 46 to a small reservoir 51.

The tubes 16, 18, 20, 22, 24, 26, 28, 30, 31, and 32 may conveniently be made of glass, although other materials might be used. The connections 17, 19, 21, 23, 25, 27, and 29 are preferably pieces of metal, suitably bored and formed to receive the ends of the glass tubes as shown in Fig. 7. Screw plugs 55 are preferably provided in the lower connections 17, 21, and 29 so that when necessary these plugs may be removed to drain the liquid contents from the tubes. The upper connections 19, 23, and 27, in addition to plugs 56 at the sides, preferably also have plugs 57 arranged directly over the upper ends of the respective tubes so that, when the plugs 57 are removed, the desired quantities of liquid can be poured individually into the various tubes.

When no external pressure is acting upon the part of the apparatus shown in Figs. 3 and 4, the lower parts of the tubes 16, 18, 20, 22, 24, 26, 28, 30, 31, and 32 are preferably filled with mercury and the upper parts of the tubes 16, 18, 20, 22, 24, 26, and 28 are preferably completely filled with water. Then, when the steam pressure in the boiler 11 or any other desired pressure which is used for control of this apparatus, is admitted to the conduit 15, this pressure will force the mercury in the tube 16 downwardly, causing it to rise in the tube 18, which will force some of the water from the tube 18 over into the tube 20, depressing the mercury in the lower end of the tube 20 and forcing it up into the tube 22. This will force some of the water from the tube 22 into the upper end of the tube 24, which depresses the mercury in the tube 24, forcing it around into the tube 26, forcing water from this tube into the tube 28, and forcing some of the mercury out of the lower end of the tube 28. The mercury thus forced out of the tube 28 will flow into the tube 30, raising the level of mercury in the tubes 30, 31, and 32 so that the mercury will rise upwardly into the space between the glass plates 46 of the shutter. The total steam pressure or other pressure in the conduit 15 will thus be balanced by the pressure differentials of the mercury, less the pressure differentials of the water, in the U-tube assemblies 16 to 30, inclusive, and the mercury will assume some such position as that indicated in Fig. 4. The plunger 42 is then adjusted in its cylinder 41, upwardly or downwardly as may be necessary, in order to make the level of the mercury in the shutter rise to some predetermined height, such as exactly to the center of the shutter, when the predetermined desired normal pressure is operating on this apparatus through the conduit 15 and when the normal amount of gas pressure in the burner is operating upon the other end of the mercury through the conduit 33. The plunger 42, when adjusted, is held stationary in its adjusted position by its friction within the cylinder 41 or by any suitable clamping or holding mechanism.

On one side of the shutter 45 is a suitable light source 60, such as an incandescent electric bulb, arranged to project light through the glass plates 46 of the shutter insofar as such light is not interfered with by mercury within the shutter. The light thus passing through the shutter falls upon two photo-electric or light sensitive cells 61 and 62. These cells are connected electrically to suitable relays 63 and 64, respectively. One of these relays, such as 63, is set to operate when the light intensity on its photo-electric cell 61 decreases, and the other relay, 64, is set to operate when the light intensity on its photo-electric cell 62 increases. Circuit 65 runs from the relay 63 to the electric motor 68 which operates the gas valve 34, to operate this motor in a valve closing direction, and another circuit 66 runs from the relay 64 to the motor 68, to operate the motor in a valve opening direction.

The relays 63 and 64, like the photo-electric cells 61 and 62, may be of any known or conventional construction. In Fig. 8 there is diagrammatically shown one suitable form of wiring diagram for the photo-electric cell 62 and relay 64, although other suitable wiring arrangements might be substituted without departing from the invention. Current comes from the mains or leads 71 and 72, and flows through the wire 73 to the photo-electric cell 62, through that cell, by the wire 74 to the electro-magnet 75 forming part of the relay 64, and from this electro-magnet back to the mains by the wire 76. The armature 78, when attracted by the magnet 75, forms a connection across contacts 79, allowing current to flow through the circuit wires 66 to the motor 68. As the light intensity on the photo-electric cell 62 increases a greater quantity of current flows through the winding on the magnet 75, thus attracting the armature 78, closing the contacts 79, energizing the circuit 66 and operating the electric motor 68 in a direction to open the gas valve 34 to a greater extent.

Figure 2:
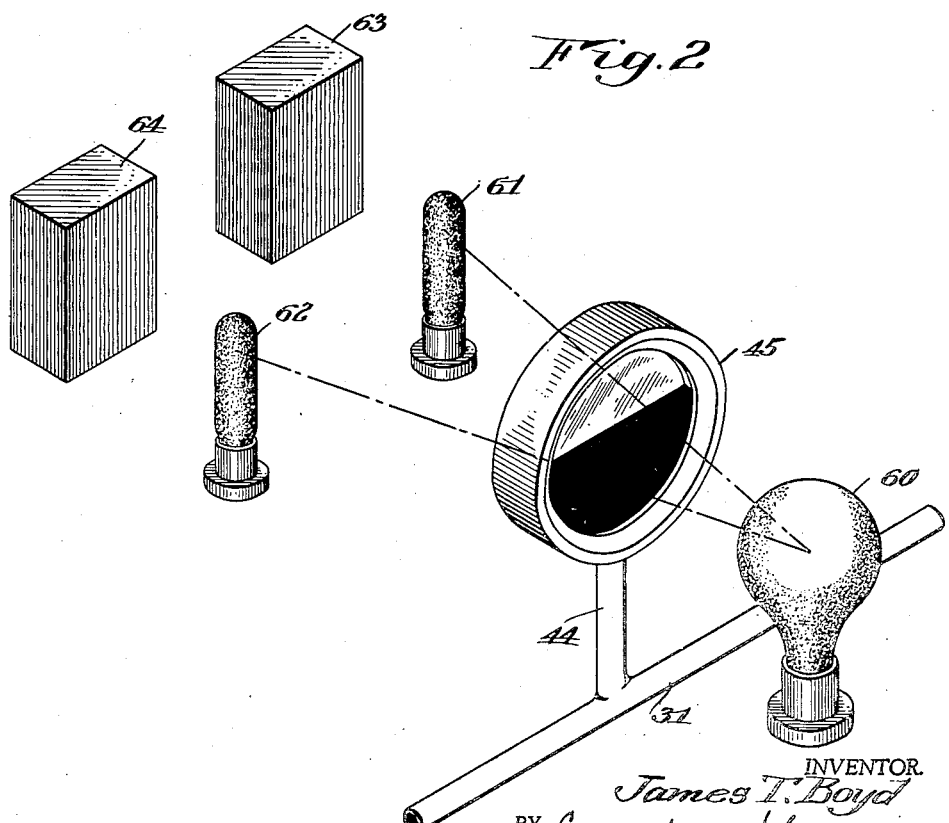
Fig. 2 is a perspective view of certain parts of the apparatus in operative relation to each other.

In operation the parts normally are in the position shown in Figs. 2 and 4, with the mercury rising to a level approximately at the center of the mercury shutter when the pressure in the boiler 11 is at the normal desired amount. If, due to increased load on the boiler, the pressure in the boiler drops, the pressure in the line 15 will be decreased, and the level of the mercury in the shutter will fall. This will allow more light to pass through the mercury shutter from the light source 60 to the two photo-electric cells 61 and 62. Although both photo-electric cells will receive more light, the relay 63 of the cell 61 will not be operated, because this relay operates only upon decreasing light intensity. The relay 64 of cell 62 will, however, be operated because this relay is set to operate upon increasing light. The operation of the relay 64 will cause operation of the valve motor 68 in a direction to open the gas valve 34 somewhat wider, thus admitting additional fuel from the fuel supply line 12 to the burner 13, to compensate for the increased load on the boiler. At the same time, the opening of the valve 34 will increase the gas pressure in that part of the conduit which is beyond the valve, which will increase the pressure in the conduit 33, and as the increased gas pressure presses downwardly on the upper end of the mercury in the U-tube 32, it will force some of the mercury back up into the shutter 45, restoring the mercury approximately to its normal height, decreasing the light intensity on the cells to the normal amount, which will open the relay 64, and stop the operation of the motor 68.

On the other hand, if the pressure in the boiler should increase, due to a decrease in load, the increased pressure in the conduit 15 will cause the mercury to rise in the shutter 45. This would decrease the amount of light passing through the shutter onto both the photo-electric cells 61 and 62. This time, the relay 64 which operates only on increasing light intensity, would not be affected, but the relay 63 would be operated, so that the circuit 65 would be energized and the motor 68 would be operated in a direction to close the gas valve 34. As this valve partially closes, partially cutting off the fuel supply to the burner 13, the pressure in the conduit 33 would decrease and this lessening of the pressure on the top of the mercury in the U-tube 32 would allow the mercury in the shutter to sink back again approximately to its normal level, thus increasing the light intensity on the light sensitive cells to approximately the normal extent, stopping the operation of the relay 63, and stopping the operation of the motor 68.

If, through a sudden drop in the load, the boiler pressure should rise suddenly, the mercury might be forced up not only to fill the entire space between the glass plates 46 of the shutter 45, but also upwardly through the duct 50 at the top of the shutter. The reservoir 51 is provided for just such contingencies, so that the mercury may flow up into this reservoir to the depth necessary, without spilling, and then when the pressure is reduced to normal, the mercury will simply flow downwardly again to the duct 50 and through the shutter.

It will be seen that the apparatus of the present invention is particularly useful in connection with the control of gas fired boilers, but those skilled in the art will readily appreciate that it may be used for various other purposes, since the circuits from the relays 63 and 64 need not necessarily run to a motor controlling a gas valve, but may run to any desired motor or other machinery, and the conduits 15 and 33 may be connected to or influenced by any desired pressures. Hence the disclosure of the invention in connection with a gas fired boiler is to be understood to be only a convenient and preferred example of many possible fields of use of the invention.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Apparatus for controlling fuel supply to a boiler in response to pressure variations within said boiler, said apparatus comprising a body of liquid having a position variable in response to pressure variations within said boiler, a source of light on one side of said body of liquid, light sensitive cell means on the opposite side of said body of liquid from said source of light so that the intensity of light reaching said cell means is a function of the position of said liquid, and electric circuit means connected to said cell means and responsive to variations in intensity of light reaching said cell means, for controlling the supply of fuel to said boiler.

2. Apparatus for controlling an element in response to pressure variations, said apparatus comprising a source of light, light sensitive cell means adapted to receive light from said source, electric circuit means connected to said cell means and responsive to variations in intensity of light reaching said cell means, a body of substantially opaque liquid located between said source of light and said cell means and having a position variable in response to pressure variations to act as a shutter to control the amount of light reaching said cell means from said source, and an adjustable displacing element for displacing part of said body of liquid to adjust the height of that part thereof which is located between said source of light and said cell means.

3. Apparatus for controlling fuel supply to a boiler in response to pressure variations within said boiler, said apparatus comprising a source of light, light sensitive cell means for receiving light from said source, electric circuit means connected to said cell means and responsive to variations in the quantity of light reaching said cell means for controlling the supply of fuel to said boiler, and a plurality of columns of mercury in series with each other and with the pressure within said boiler to be moved by variations in said pressure, a portion of one of said columns being interposed between said light source and said cell means to act as a movable shutter controlling the amount of light reaching said cell means from said light source.

4. Control apparatus comprising a source of light, light sensitive cell means for receiving light from said source and effective upon an increase in the light received to perform one operation, other light sensitive cell means for receiving light from said source and effective upon a decrease in the light received to perform another operation, and movable shutter means interposed between said light source and both of said cell means for concomitantly controlling the amount of light received by both of said cell means from said light source.

5. Control means comprising two substantially transparent flat members spaced from and substantially parallel to each other, a source of light on one side of said two transparent members in position so that light therefrom may pass through both of said transparent members, light sensitive cell means on the opposite side of said transparent members from said light source and arranged in position to receive light passing from said light source through said transparent members, electric circuit means operatively connected to said cell means, and a body of substantially opaque liquid between two said transparent members to act as a movable shutter to control the amount of light reaching said cell means from said light source.

6. Control apparatus comprising two substantially transparent members spaced from each other, a source of light in position to project rays through both of said transparent members, two separate light sensitive cell means on the opposite side of said transparent members from said source of light, both of said cell means being in position to receive light rays passing from said source through said transparent members, means controlled by one of said cell means for performing one function upon an increase in the amount of light falling upon its cell means, means controlled by the other of said cell means for performing another function upon a decrease in the amount of light falling upon its cell means, and a body of mercury interposed between said two transparent members and movable therein to different elevations to act as a shutter to control the amount of light reaching both of said cell means from said source of light.

7. Control apparatus comprising two substantially transparent members spaced from each other, a source of light in position to project rays through both of said transparent members, two separate light sensitive cell means on the opposite side of said transparent members from said source of light, both of said cell means being in position to receive light rays passing from said source through said transparent members, means controlled by one of said cell means for performing one function upon an increase in the amount of light falling upon its cell means, means controlled by the other of said cell means for performing another function upon a decrease in the amount of light falling upon its cell means, a body of mercury interposed between said two transparent members and movable therein to different elevations to act as a shutter to control the amount of light reaching both of said cell means from said source of light, and means for controlling the level of said mercury in response to pressure variations.

8. Control means for gas fired boilers, said means comprising a fuel gas control valve, a source of light, a light sensitive cell positioned to receive light from said source, means effective upon a decrease in the amount of light falling upon said cell to move said valve in one direction, a second light sensitive cell positioned to receive light from said source, means effective upon an increase in the amount of light falling upon said cell to move said valve in the opposite direction, and movable shutter means controlled at least in part by the pressure within said boiler for controlling the amount of light reaching both of said light sensitive cells from said source of light.

9. Control means for gas fired boilers, said means comprising a fuel gas control valve, a source of light, a light sensitive cell positioned to receive light from said source, means effective upon a decrease in the amount of light falling upon said cell to move said valve in one direction, a second light sensitive cell positioned to receive light from said source, means effective upon an increase in the amount of light falling upon said cell to move said valve in the opposite direction, and means controlled at least in part by the pressure within said boiler for interposing a body of mercury to a variable extent between said light source and both of said cell means to control the amount of light reaching said cell means from said light source.

10. Control means for gas fired boilers, said means comprising a fuel gas control valve, a source of light, a light sensitive cell positioned to receive light from said source, means effective upon a decrease in the amount of light falling upon said cell to move said valve in one direction, a second light sensitive cell positioned to receive light from said source, means effective upon an increase in the amount of light falling upon said cell to move said valve in the opposite direction, a liquid shutter interposed between said source of light and both of said cell means for controlling the amount of light reaching said cell means from said source, and means controlled jointly by the pressure in said boiler and the pressure of gas adjacent the gas burner for controlling the position of said liquid shutter means.

11. Control means for gas fired boilers, said means comprising a fuel gas control valve, a source of light, a light sensitive cell positioned to receive light from said source, means effective upon a decrease in the amount of light falling upon said cell to move said valve in one direction, a second light sensitive cell positioned to receive light from said source, means effective upon an increase in the amount of light falling upon said cell to move said valve in the opposite direction, two substantially transparent elements slightly spaced from each other and arranged in the path of light rays from said light source to both of said cell means, a body of mercury between said two transparent members, and means controlled at least in part by the pressure within said boiler for varying the level of the mercury between said transparent members to cut off a greater or lesser quantity of light passing from said light source to said cell means.

12. Control means for gas fired boilers, said means comprising a fuel gas control valve, light sensitive cell means, means controlled by the amount of light falling upon said cell means for operating said valve, a source of light in position to supply light to said cell means, a body of liquid interposed between said cell means and said source of light to control the amount of light from said source falling upon said cell means in accordance with variations in the level of said liquid, and means controlled at least in part by the pressure within said boiler for controlling the level of said liquid.

JAMES T. BOYD.